Aug. 27, 1957

E. M. JEPPSSON 2,804,179

SLACK ADJUSTERS

Filed Sept. 6, 1955

2 Sheets-Sheet 2

ERIK M. JEPPSSON
INVENTOR

BY Wendenoth, Lind and Ponack
ATTORNEYS

United States Patent Office 2,804,179
Patented Aug. 27, 1957

2,804,179

SLACK ADJUSTERS

Erik Mauritz Jeppsson, Limhamn, Sweden, assignor to Svenska Aktiebolaget Bromsregulator, Malmo, Sweden, a corporation of Sweden Application September 6, 1955, Serial No. 532,438

Claims priority, application Germany September 13, 1954

1 Claim. (Cl. 188—196)

This invention relates to automatic slack adjusters for the brake rigging of railway cars and like vehicles and more particularly to automatic slack adjusters of the type comprising a screw threaded spindle and a nut screwed thereon, the coacting threads of said spindle and nut being of such a high lead as to be non-selflocking, and said nut being normally urged by axial spring force into frictional engagement with an annular seat on a non-rotatable part of the slack adjuster for preventing unintentional rotation of said nut on said spindle under the action of the torque which said spring force exerts on said nut due to the non-selflocking character of said threads.

Examples of automatic brake slack adjusters of this type are disclosed in the U. S. Patent No. 2,767,811 to B. H. Browall and E. M. Jeppsson (U. S. application Ser. No. 259,864, filed December 4, 1951), wherein said nut on said spindle is provided with an integral flange for its frictional engagement with said annular seat on said non-rotatable part of the slack adjuster. Experience has shown that this prior construction is insufficient for securely holding said nut against rotation on said spindle when the slack adjuster is in normal position at released brakes, in that unintentional rotation of said nut may occur under the action of shocks and vibrations during the travel of the vehicle. Under the action of such shocks and vibrations said nut and its integral flange may tilt slightly in relation to said seat so as temporarily to lose its support on said seat but for at some single point thereof, and this may result in rotation of said nut under the action of the aforesaid torque thereon.

Figure 1:
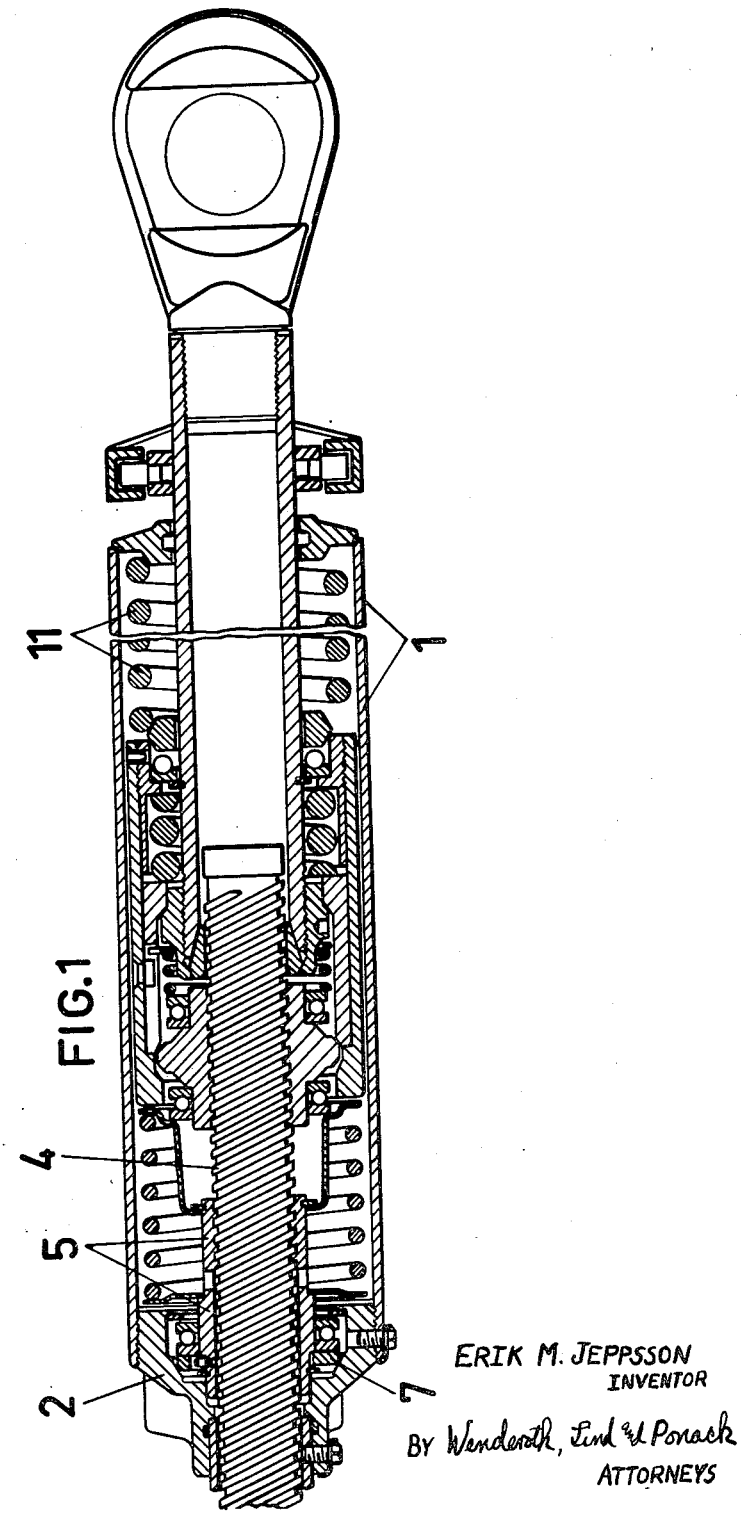
Figure 2:
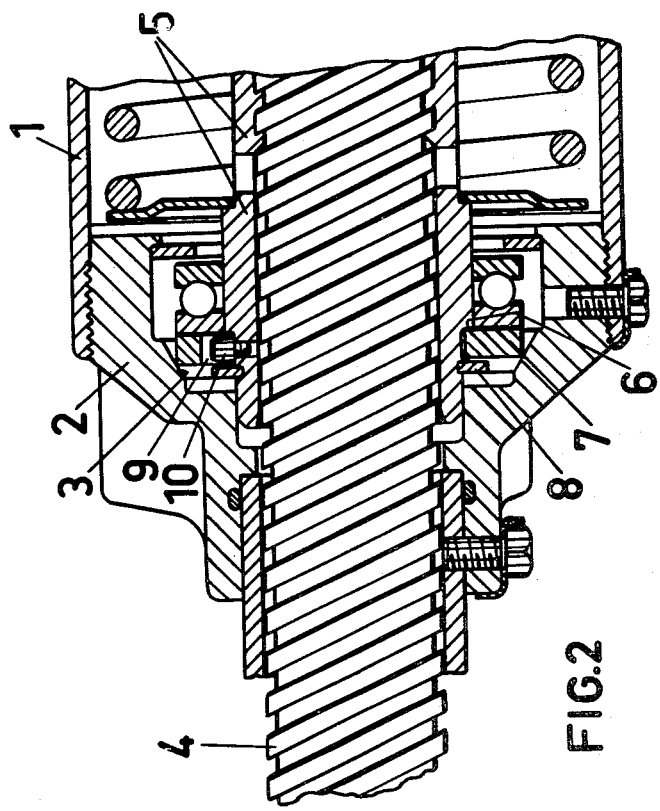

The invention has for its object to provide automatic slack adjusters of the type set forth with means remedying the above insufficiency by securely holding said nut against unintentional rotation on said spindle even when subjected to shocks and vibrations during the travel of the vehicle. Further and more specific objects of the invention will become apparent from the following description, reference being had to the accompanying drawing which illustrates a preferred form of the invention and in which Fig. 1 is an axial section through an automatic slack adjuster of the type disclosed in Figs. 1 and 2 of the aforesaid U. S. Patent No. 2,767,811, and Fig. 2 shows part of Fig. 1 on a larger scale.

In the drawing, 1 designates a tubular rod which is non-rotatably connected to a feed sleeve 2 having an annular seat surface 3. A screw threaded spindle of such a high lead as to be non-selflocking is designated 4. A feed nut 5 is screwed onto the screw threaded spindle 4. The nut 5 has an annular, thickened portion which forms a radially extending shoulder 6 against which a ring 7 is applied. The ring 7 is loosely mounted on the nut 5 and serves as a flange which is secured to said nut with a small play in axial direction by means of a resilient locking ring 8 which engages a groove provided in the nut 5. At a point of its internal periphery the ring 7 has a recess 9 in which a pin 10 engages, said pin being screwed into the nut 5. The engagement of the pin in the recess 9 is such that axial as well as tilting movements are possible between the ring 7 and the nut 5, whereas the ring 7 is prevented from rotating in relation to the nut 5. The ring 7 engages the seat surface 3 with an external peripheral corner. The radial play of the internal cylinder surface of the ring 7 in relation to the periphery of the nut is larger than the largest possible parallel displacement of the nut into eccentric position with respect to the seat surface 3 and also permits the greatest possible swinging of the axis of the nut at an angle to the axis of the ring so that the nut can perform these movements without taking the ring along.

In the normal position of the slack adjuster a spring 11 (Fig. 1) interposed between the tubular rod 1 and the screw threaded spindle 4 acts in a known manner approximately in the axial direction of the spindle in order to press the seat 3 of the feed sleeve 2 against the ring 7. The latter in turn is pressed by the spring force against the shoulder 6 on the nut 5. Although the threads of the screw threaded spindle and those of the nut are non-selflocking so that a certain torque is produced by the axial pressure, the nut is however prevented from an axial displacement on the screw threaded spindle because the friction torque of the ring 7 and seat 3 is larger than said first-mentioned torque. The ring 7 is coupled with the nut 5 in the direction of rotation by the pin 10 engaging in the recess 9, and the nut will therefore be retained in its position on the screw threaded spindle by said axial pressure as long as the tubular rod 1 is not rotatable in relation to said spindle, which is the case in the normal position of the slack adjuster.

In the normal position of the slack adjuster, vibrations or shocks during the travel of the vehicle may displace the screw threaded spindle 4 in parallel into eccentric positions with respect to the seat surface 3 or make the spindle swing with its axis at an angle to the axis of the seat surface 3. The nut 5 is positively taken along in these movements of the spindle and thanks to the above-mentioned connection with the ring 7, which has a certain play, it can perform these movements without causing the ring to take part in them. As the point of application of the ring 7 against the shoulder 6 on the nut 5, as seen in axial projection, is always located radially inside the annular seat surface 3 and the spring acts substantially in the axial direction of the spindle 4, the ring 7 will always be applied, around its entire periphery, against the seat surface 3 in spite of the described movements of the nut 5, so that it is safely retained against rotation in relation to the feed sleeve 2 also during said movements. Owing to the described connection of the ring 7 with the pin 10, the nut 5 will consequently be non-rotatably retained in relation to the feed sleeve 2 and the screw threaded spindle 4 during the said movements of the nut despite the existing torque between the spindle and the nut even though the nut should temporarily support itself with its shoulder 6 at one point only on the ring 7, during these movements.

What I claim and desire to secure by Letters Patent is:

In an automatic brake slack adjuster of the character described comprising a two-part brake rod, the two parts of which are axially movable in relation to each other, one of said parts being a screw-threaded spindle, a nut screwed on said spindle, the coacting threads of said spindle and nut being of such a high lead as to be non-selflocking, a member axially movable on said brake rod, spring means axially urging said member in one direction in relation to the other part of said brake rod, an annular seat on said member, and means on said nut normally engaged by said seat on said member under the action of said spring means for holding said nut against rotation in relation to said member, an improvement consisting in said means on said nut comprising axially spaced facing axial abutments positioned, as seen in the direction of the axis of said spindle, radially inside said annular seat on said member, a ring mounted on said nut and having a loose fit thereon between said axial abutments to allow for small axial and tilting movements of said ring in relation to said nut, means connecting said ring and nut for obstructing rotation of said ring and nut in relation to each other without obstructing such small axial and tilting movements of said ring in relation to said nut as allowed for by said loose fit of said ring between said axial abutments on said nut, and said ring having an annular surface normally engaged by said annular seat on said member under the action of said spring means.

References Cited in the file of this patent

UNITED STATES PATENTS

| | | |
|---|---|---|
| 2,089,733 | Criley | Aug. 10, 1937 |
| 2,225,001 | Browall | Dec. 17, 1940 |